(12) United States Patent
Lenz

(10) Patent No.: US 6,735,484 B1
(45) Date of Patent: May 11, 2004

(54) PRINTER WITH A PROCESS DIAGNOSTICS SYSTEM FOR DETECTING EVENTS

(75) Inventor: Gary A. Lenz, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 616 days.

(21) Appl. No.: 09/666,899

(22) Filed: Sep. 20, 2000

(51) Int. Cl.⁷ .............................................. G05B 13/02
(52) U.S. Cl. ...................................... 700/51; 700/275
(58) Field of Search ............................. 700/28, 48–50, 700/71, 109, 117, 275, 51; 399/49, 11, 113, 162; 347/4, 19; 358/1.9, 1.18, 1.16

(56) References Cited

U.S. PATENT DOCUMENTS

| 3,096,434 A | 7/1963 | King ............................ 235/151 |
| 3,404,264 A | 10/1968 | Kugler ......................... 235/194 |
| 3,468,164 A | 9/1969 | Sutherland .................... 73/343 |
| 3,590,370 A | 6/1971 | Fleischer ...................... 324/51 |
| 3,688,190 A | 8/1972 | Blum .......................... 324/61 R |
| 3,691,842 A | 9/1972 | Akeley ....................... 73/398 C |
| 3,701,280 A | 10/1972 | Stroman ....................... 73/194 |
| 3,973,184 A | 8/1976 | Raber .......................... 324/51 |
| RE29,383 E | 9/1977 | Gallatin et al. ................ 137/14 |
| 4,058,975 A | 11/1977 | Gilbert et al. ............... 60/39.28 |
| 4,099,413 A | 7/1978 | Ohte et al. ..................... 73/359 |
| 4,102,199 A | 7/1978 | Talpouras ...................... 73/362 |
| 4,122,719 A | 10/1978 | Carlson et al. ................ 73/342 |
| 4,129,875 A | * 12/1978 | Ito et al. ........................ 347/80 |
| 4,179,732 A | 12/1979 | Khan et al. ................... 364/200 |
| 4,250,490 A | 2/1981 | Dahlke .................... 340/870.37 |
| 4,282,583 A | 8/1981 | Khan et al. ................... 364/900 |
| 4,313,683 A | 2/1982 | Brown et al. ................. 400/225 |
| 4,337,516 A | 6/1982 | Murphy et al. ............... 364/551 |
| 4,399,824 A | 8/1983 | Davidson ..................... 128/736 |
| 4,517,468 A | 5/1985 | Kemper et al. ................ 290/52 |
| 4,530,234 A | 7/1985 | Cullick et al. .................. 73/53 |
| 4,571,689 A | 2/1986 | Hildebrand et al. ......... 364/481 |
| 4,635,214 A | 1/1987 | Kasai et al. ................. 364/551 |
| 4,642,782 A | 2/1987 | Kemper et al. .............. 364/550 |

(List continued on next page.)

FOREIGN PATENT DOCUMENTS

| DE | 32 13 866 A1 | 10/1983 |
| DE | 35 40 204 C1 | 9/1986 |

(List continued on next page.)

OTHER PUBLICATIONS

"A TCP\IP Tutorial" by, Socolofsky et al., Spider Systems Limited, Jan. 1991 pp. 1–23.

(List continued on next page.)

*Primary Examiner*—Anil Khatri
*Assistant Examiner*—Ronald D Hartman, Jr.
(74) *Attorney, Agent, or Firm*—Westman, Champlin & Kelly, P.A.

(57) ABSTRACT

An identification card printer for printing an identification card includes a print mechanism configured to print onto the identification card. A process signal input is configured to receive a process signal related to operation of the identification card printer. A memory contains a nominal process signal statistical parameter and a rule. A microprocessor is coupled to the memory and configured to receive the process signal from the process signal input and calculates a statistical parameter of the process signal. The microprocessor compares the calculated statistical parameter to the nominal statistical parameter based upon the rule and responsively provides an event output as a function of the comparison. The event output is related to an occurrence of an event during operation of the identification card printer.

68 Claims, 7 Drawing Sheets

U.S. PATENT DOCUMENTS

| | | | |
|---|---|---|---|
| 4,644,479 A | 2/1987 | Kemper et al. | 364/550 |
| 4,649,515 A | 3/1987 | Thompson et al. | 364/900 |
| 4,707,796 A | 11/1987 | Calabro et al. | 364/552 |
| 4,719,626 A | 1/1988 | Ogasawara | 371/16 |
| 4,736,367 A | 4/1988 | Wroblewski et al. | 370/85 |
| 4,777,585 A | 10/1988 | Kokawa et al. | 364/164 |
| 4,831,564 A | 5/1989 | Suga | 364/551.01 |
| 4,841,286 A | 6/1989 | Kummer | 340/653 |
| 4,852,785 A * | 8/1989 | Bettendorf et al. | 226/42 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,934,196 A | 6/1990 | Romano | 73/861.68 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,027,135 A | 6/1991 | Negishi et al. | 346/154 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,472 A * | 5/1993 | Czuprynski | 399/162 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,392,065 A * | 2/1995 | Suzuki | 347/88 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,412,779 A | 5/1995 | Motoyama | 395/275 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,441,921 A | 8/1995 | Verdonck et al. | 503/227 |
| 5,442,639 A | 8/1995 | Crowder et al. | 371/20.1 |
| 5,455,611 A | 10/1995 | Simon et al. | 347/49 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Borden et al. | 73/718 |
| 5,510,779 A | 4/1996 | Maltby et al. | 340/870.3 |
| 5,511,004 A | 4/1996 | Dubost et al. | 364/551.01 |
| 5,537,554 A | 7/1996 | Motoyama | 395/280 |
| 5,544,289 A | 8/1996 | Motoyama | 395/280 |
| 5,548,528 A | 8/1996 | Keeler et al. | 364/497 |
| 5,561,599 A | 10/1996 | Lu | 364/164 |
| 5,568,618 A | 10/1996 | Motoyama | 395/280 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,598,521 A | 1/1997 | Kilgore et al. | 395/326 |
| 5,600,148 A | 2/1997 | Cole et al. | 250/495.1 |
| 5,623,605 A | 4/1997 | Keshav et al. | 395/200.17 |
| 5,627,572 A * | 5/1997 | Harrington et al. | 347/23 |
| 5,637,802 A | 6/1997 | Frick et al. | 73/724 |
| 5,640,491 A | 6/1997 | Bhat et al. | 395/22 |
| 5,649,120 A | 7/1997 | Motoyama | 395/280 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,696,685 A * | 12/1997 | Lee et al. | 705/408 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,978 A | 1/1998 | Frick et al. | 340/511 |
| 5,708,585 A | 1/1998 | Kushion | 364/431.061 |
| 5,713,668 A | 2/1998 | Lunghofer et al. | 374/179 |
| 5,719,378 A | 2/1998 | Jackson, Jr. et al. | 219/497 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,752,008 A | 5/1998 | Bowling | 395/500 |
| 5,764,891 A | 6/1998 | Warrior | 395/200.2 |
| 5,768,495 A | 6/1998 | Campbell et al. | 395/183.01 |
| 5,774,678 A | 6/1998 | Motoyama | 395/280 |
| 5,781,878 A | 7/1998 | Mizoguchi et al. | 701/109 |
| 5,796,420 A | 8/1998 | Kaerts et al. | 347/188 |
| 5,797,069 A * | 8/1998 | Kimura et al. | 399/113 |
| 5,801,689 A | 9/1998 | Huntsman | 345/329 |
| 5,805,442 A | 9/1998 | Crater et al. | 364/138 |
| 5,819,110 A | 10/1998 | Motoyama | 395/835 |
| 5,828,567 A | 10/1998 | Eryurek et al. | 364/184 |
| 5,829,876 A | 11/1998 | Schwartz et al. | 374/1 |

| | | | |
|---|---|---|---|
| 5,848,383 A | 12/1998 | Yuuns | 702/102 |
| 5,859,964 A | 1/1999 | Wang et al. | 395/185.01 |
| 5,876,122 A | 3/1999 | Eryurek | 374/183 |
| 5,887,216 A | 3/1999 | Motoyama | 399/8 |
| 5,887,978 A | 3/1999 | Lunghofer et al. | 374/179 |
| 5,893,083 A * | 4/1999 | Eshghi et al. | 706/45 |
| 5,901,286 A * | 5/1999 | Danknick et al. | 709/203 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,940,290 A | 8/1999 | Dixon | 364/138 |
| 5,956,663 A | 9/1999 | Eryurek et al. | 702/183 |
| 5,967,394 A * | 10/1999 | Crowley et al. | 226/31 |
| 5,970,430 A | 10/1999 | Burns et al. | 702/122 |
| 5,980,011 A * | 11/1999 | Cummins et al. | 347/4 |
| 5,999,761 A * | 12/1999 | Binder et al. | 399/49 |
| 6,016,706 A | 1/2000 | Yamamoto et al. | 9/6 |
| 6,017,143 A | 1/2000 | Eryurek et al. | 700/51 |
| 6,045,260 A | 4/2000 | Schwartz et al. | 374/183 |
| 6,047,220 A | 4/2000 | Eryurek et al. | 700/28 |
| 6,047,222 A | 4/2000 | Burns et al. | 700/79 |
| 6,109,723 A * | 8/2000 | Castle et al. | 347/19 |
| 6,119,047 A | 9/2000 | Eryurek et al. | 700/28 |
| 6,147,698 A * | 11/2000 | Zable et al. | 347/240 |
| 6,170,007 B1 | 1/2001 | Venkatraman et al. | 709/218 |
| 6,192,281 B1 | 2/2001 | Brown et al. | 700/2 |
| 6,195,591 B1 | 2/2001 | Nixon et al. | 700/83 |
| 6,199,018 B1 | 3/2001 | Quist et al. | 702/34 |
| 6,227,534 B1 * | 5/2001 | Schoedinger et al. | 271/114 |
| 6,241,332 B1 * | 6/2001 | Cummins et al. | 347/4 |
| 6,279,901 B1 * | 8/2001 | Fulmer | 271/272 |
| 6,318,833 B1 * | 11/2001 | Lyman et al. | 347/19 |
| 6,336,007 B1 * | 1/2002 | Sugisaki et al. | 399/11 |
| 6,375,298 B2 * | 4/2002 | Purcell et al. | 347/14 |
| 6,375,299 B1 * | 4/2002 | Foster et al. | 347/19 |
| 6,480,299 B1 * | 11/2002 | Drakopoulos et al. | 358/1.9 |
| 6,512,594 B1 * | 1/2003 | Lenz et al. | 358/1.16 |
| 6,527,026 B1 * | 3/2003 | Huggins | 156/387 |
| 6,535,299 B1 * | 3/2003 | Scherz | 358/1.18 |

FOREIGN PATENT DOCUMENTS

| | | |
|---|---|---|
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |

OTHER PUBLICATIONS

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C", by M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepart et al., Apr. 1992.

"Tuned–Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1—50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperture Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Valiation and Plant Monitoring," by B. Upadhyaya, *International Fast Reactor Safety Meeting*, Aug. 12–16, 1990, pp. 2–10.

"Neural Networks for Sensor Validation and Plantwide Monitoring," E. Eryurek, 1992.

"A New Method of Johnson Noise Thermometry", by C.J. Borkowski et al,. *Rev. Sci. Instrum.*, vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.—Oct. 1998).

"Transient Pressure Signals in Mechanical Heart Valve Caviation," by Z.J Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Actuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziele und Anwendungen von Feldbussystemen," by T. Pfeifer et al., pp. 549–557 (10/87).

"PROFIBUS–Infrastrukturmaβnahmen," by Tilo Pfeifer et al., pp. 416–419 (8/91).

"Simulation des Zeitverhaltens von Feldbussystemen," by O. Schnelle, pp. 440–442 (1991).

"Modélisation et simulation d' un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Tecnología, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Improving Dynamic Performance of Temperature Sensors With Fuzzy Control Techniques," by Wang Lei et al,. pp. 872–873 (1992).

"Microsoft Press Computer Dictionary" 2nd Edition, 1994, Microsoft Press. p. 156.

* cited by examiner

PRINTER WITH A PROCESS DIAGNOSTICS SYSTEM FOR DETECTING EVENTS

BACKGROUND OF THE INVENTION

The present invention relates to identification card printers. More specifically, the present invention relates to monitoring operation of identification card printers.

Printers are complex electro-mechanical devices that use multiple continuous and discrete processes for the transfer of an image or text to a media. Plastic ID card printers utilize multiple processes for the feeding, transport, encoding, thermal printing, lamination and stacking of plastic cards.

Plastic ID card printers can be broken into several simple process control loops each of which include an actuation device, a measurement and a controller. The actuation devices and the sensors are electromechanical devices prone to failure. The failure of a single device renders the printer inoperable. Typical actuation devices used as the final control device in a plastic ID card printer include: stepper motors, continuous motors, solenoids, clutches, cutting devices, fans, and encoding/reading devices for magnetic stripes, proximity transceiver programming, and smart card encoding. Sensors for measuring loop parameters will include: temperature sensors e.g. thermocouples, RTD's, thermister and diodes, position sensors and encoders, force sensors, current and voltage sensing circuits, switches for position or the presence of a card, magnetic stripe readers, velocity or rotational velocity etc.

Diagnostic and event monitoring techniques have been used in other industries such as industrial process control. For example, U.S. Pat. No. 6,017,143, entitled DEVICE IN A PROCESS SYSTEM FOR DETECETING EVENTS, which issued Jan. 25, 2000 shows such a system.

SUMMARY OF THE INVENTION

An identification card printer for printing an identification card includes a print mechanism configured to print onto the identification card. A process signal input is configured to receive a process signal related to operation of the identification card printer. A memory contains a nominal process signal statistical parameter and a rule. A microprocessor is coupled to the memory and configured to receive the process signal from the process signal input and calculates a statistical parameter of the process signal. The microprocessor compares the calculated statistical parameter to the nominal statistical parameter based upon the rule and responsively provides an event output as a function of the comparison. The event output is related to an occurrence of an event during operation of the identification card printer.

DETAILED DESCRIPTION OF THE PREFERRED EMBODIMENTS

The present invention includes a printer with internal processes control loops. The printer includes actuation devices that receive a control signal from a process controller. Memory in the printer contains a nominal parameter value for each process variable and a rule. Computing circuitry calculates a statistical parameter for the process signal and operates on the statistical parameter and the stored nominal value based upon the stored rule and responsively provides an event output based upon the operation. Output circuitry provides an output in response to the event output.

The present invention provides for a printer diagnostics architecture which can be used with a process containing electromechanical actuation devices used for discrete or continuous control with a sensed parameter. The diagnostics system provides for the detection and communication of an "event" in the printing process.

Printers of all types provide for the transfer of a digital image or text through some type of print mechanism to a receiving substrate such as paper, cardboard, plastic ID cards, CD-ROM's etc. Printers are a system of multiple process control loops consisting of a final control actuation device, a measurement and a controller.

Plastic ID card printers are specialized printers used for the manufacture of plastic ID cards. The ID cards frequently contain text, a photo image, a lamination layer, and a data bearing capability such as magnetic stripe, proximity transceiver, smart card chip or combinations or these.

Figure 1:
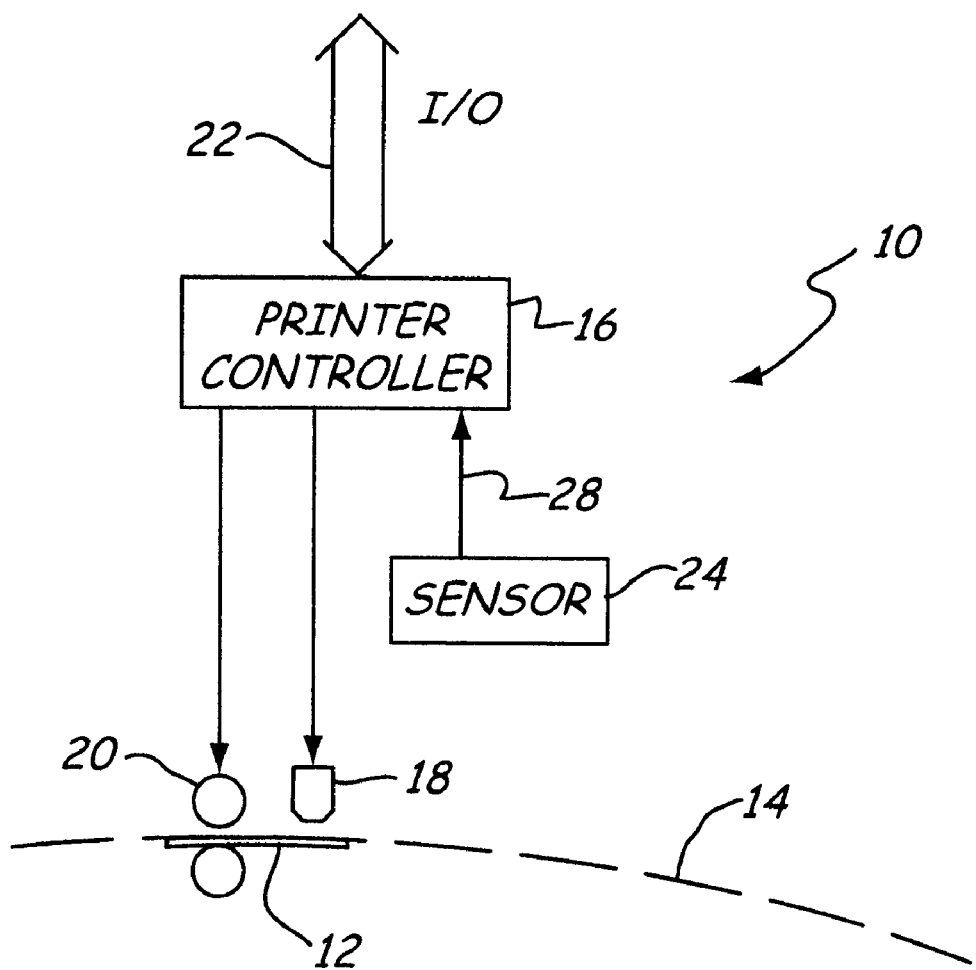
FIG. 1 is a simplified block diagram showing an identification card printer which operates in accordance with the present invention.

Plastic ID card printers such as those manufactured by Fargo Electronics require many process control loops. The diagnostics of the present invention can be applied to each of these loops. Typical processes will include:

1. The feeding of a card into the printer transport
2. The cleaning of a card with a sticky roller
3. The encoding and verification of the encoding operation for magnetic stripe born data, proximity transceivers, or smart card IC's.
4. The flipping of a card to provide for printing on both card sides
5. The printing of an image text to the card or an intermediate transfer film
6. The lamination of a thin polymer film to the card for protection of the image
7. The transport and motion control of the card from process station to station
8. The web process control for web-based supplies such as ribbons, laminate materials and intermediate transfer films
9. Cutting processes for cutting cards webs or laminates to desired size
10. Discrete control processes for on-off control of the time sequence processes
11. Temperature control of the thermal print head, ink jet heads, lamination heaters or rollers, etc.
12. Card hole punch FIG. 1 is a simplified block diagram of an identification card printer 10 for implementing the present invention. Identification card printer 10 is shown in greatly simplified form. Printer 10 is configured to print onto an identification card 12 as card 12 moves along path 14 through printer 10. Printer 10 is controlled by printer controller 16 which may comprise any number of microprocessor or hard wired control circuits. Printer controller 16 controls operation of a printing mechanism 18 such as an ink jet print head or a thermal transfer print head. Printer controller 16 causes card 12 to move along path 14 by actuating a card movement mechanism 20 such as rollers. An I/O bus 22 is configured to send and receive data to printer 10. The bus 22 can be any type of I/O link including a serial or parallel communication link, a network link, etc. A sensor 24 is configured to sense operation of some portion of printer 10. The sensor 24 provides feedback to printer controller 16 for use in controlling the printing operation. Sensor 24 can be any type of sensor, however, various examples includes position sensors, pressure sensors, heat sensors, light or optical sensors, tension sensors, quantity sensors such as sensors used to measure the amount of printing material or cards which are available, sensors used to monitor a lamination process, sensors to monitor power, current, voltage, or other inputs provided to the various actuation mechanisms within printer 10, etc. As described herein, printer controller 16 is capable of using the process signal 28 provided by sensor 24 to detect an event, such as a diagnostic event, in the operation of printer 10.

Plastic ID card printers are often used in applications where people are queued and are waiting for their photograph to be taken, and an ID card such as a driver license produced. Plastic ID card printers are designed to provide for rapid card production to minimize waiting time and to maximize the capacity of the printer.

Since plastic ID card printers consist of multiple complex actuation mechanisms and material transport systems, they are prone to failure. A single failure can render the printer inoperable. It is highly desirable to detect a pending or minor failure in advance of catastrophic failure so an appropriate maintenance action can be taken. One aspect of the present invention provides for a process diagnostics system which can be used to detect a failure for an process control system in a printer and advise the operator of an event. The event communication can be provided via a local display or communicate via a communication port to a host such as a personal computer.

Some elements of a simple implementation of the invention include:

1. A printer;
2. A sensing device for the controlled parameter with appropriate signal analog to digital converter and compensation algorithm
3. A microcontroller with
4. A control algorithm for controlling
5. A final control element with actuation device, drive
6. A user I/O device
7. A memory with a rule, initial parameter value, parameter
8. A clock
9. An input/output device for communicating with a user
10. A process setpoint Process variables are typically the primary variables being controlled in a process employed in the production of a card in a ID card printer. Process variable can mean any variable which describes the condition of a process such as, for example: temperature, position, motor current, motor voltage, rotary position, web tension, magnetic field strength, vibration, any other characteristic of the process, etc.

Control signal means any signal other than the process variable used to control the process. For example, control signal can mean the desired process value, such as desired temperature, pressure, force, position, current, voltage, tension, etc which is adjusted by a controller or used to control the process. The controller function is most commonly performed by an embedded control algorithm in a microprocessor or microcontroller in the printer. Additionally, a control signal means calibration values, alarms, alarm conditions, a signal provided to a control element such as motor current provided to a card transport roller, an energy level provided to a print head, a solenoid on/off signal etc.

A diagnostic signal as used herein includes information related to the operation of devices and printer components used for process control for a printer process, but does not include the process variables or control signals. For example, diagnostic signals include heater resistance, motor load voltage or current, print head resistance, device temperature, frequency, on-off position, spectrum or spectral components, electric or magnetic field strength, motion, electric motor back emf, or any other parameter which may be measured in the system.

A process signal can mean any signal which is related to the process or component in the process such as, a process variable, a control signal or a diagnostic signal. Process devices include any device which forms part of or couples to a process control loop and is used in the control or monitoring of a process within the printer.

Figure 2A:
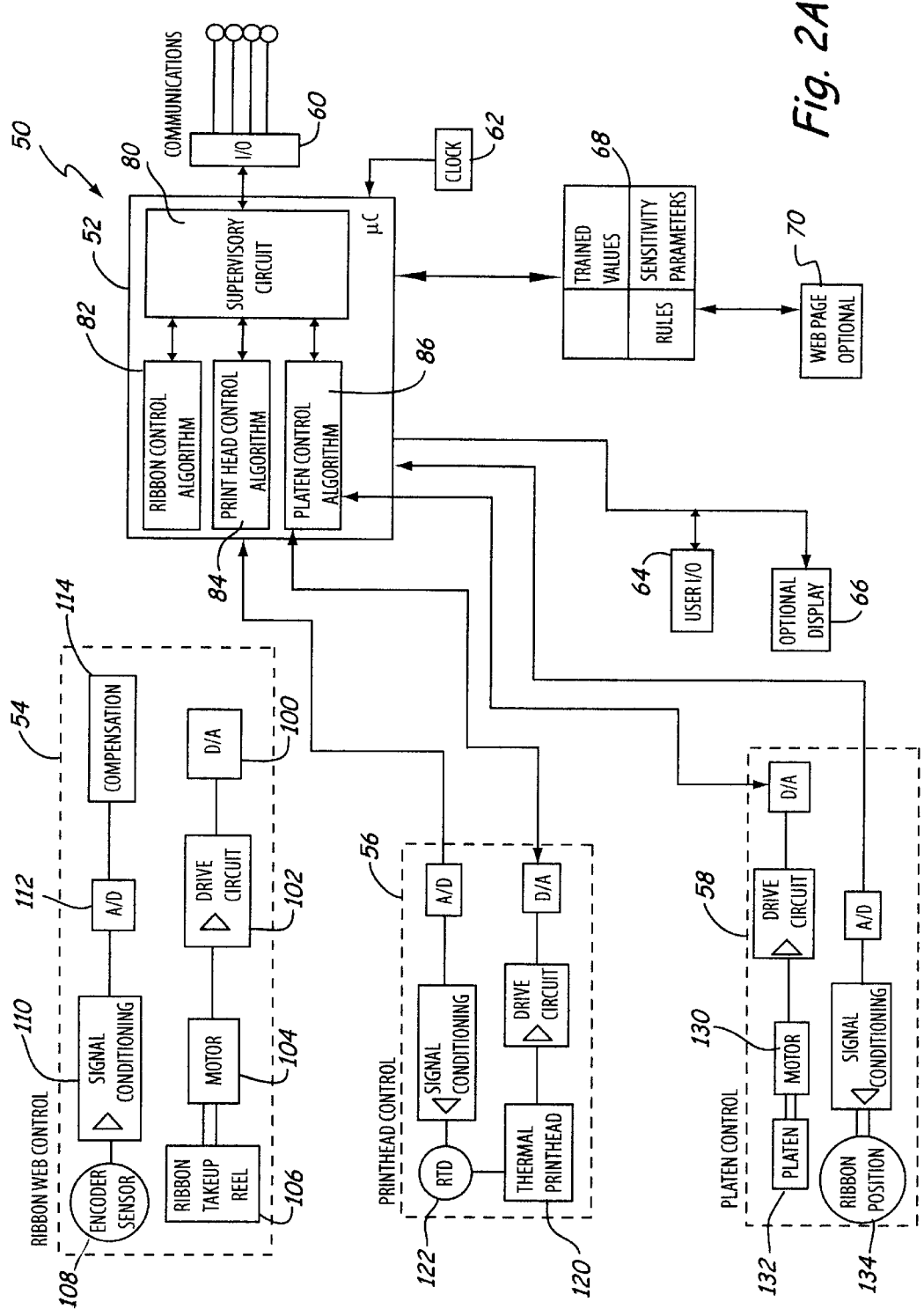
FIG. 2A and FIG. 2B are more detailed block diagrams showing operation of an identification card printer.
Figure 2B:
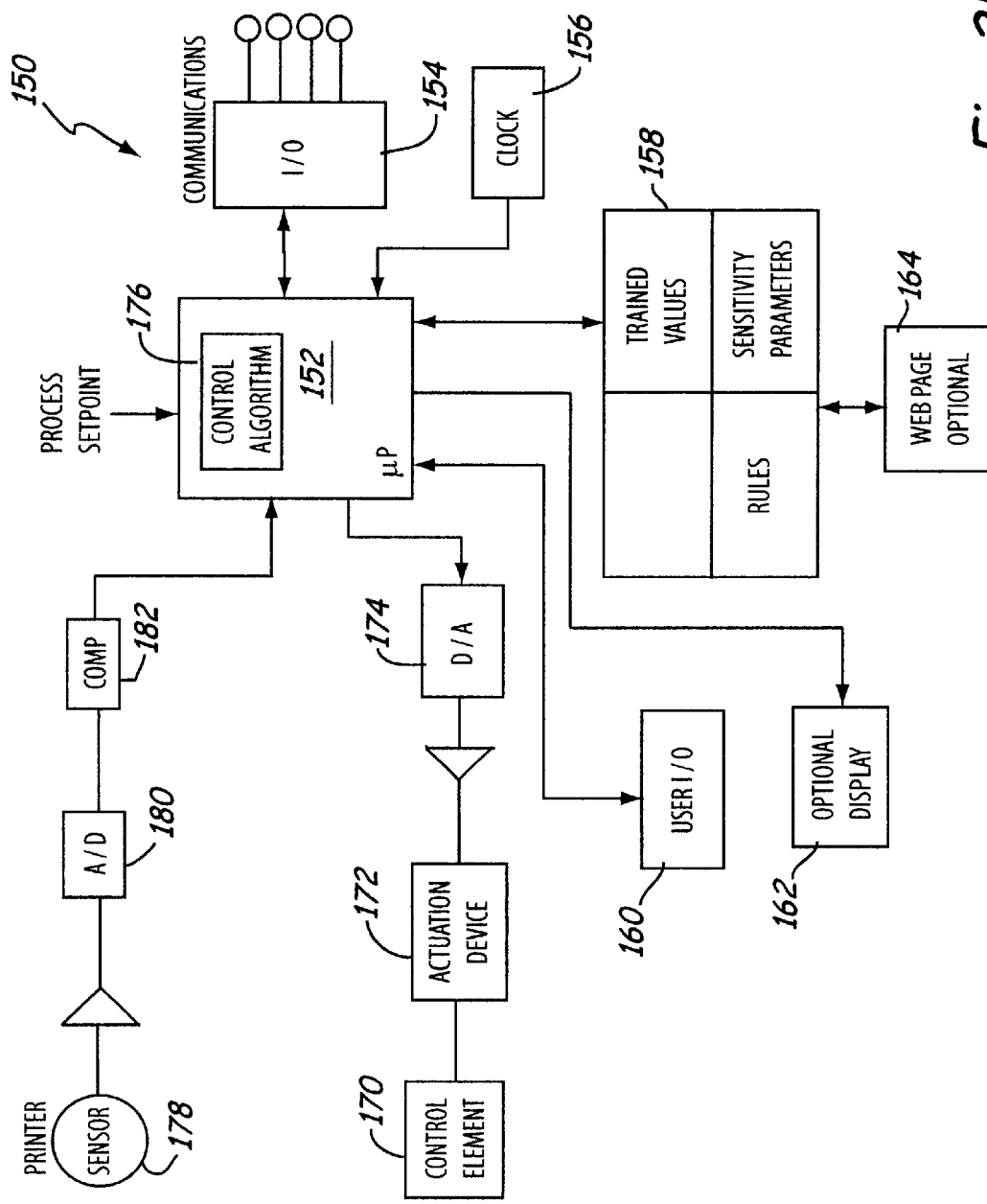

FIGS. 2A and 2B are block diagrams of a printer with a process system for detecting events in accordance with one embodiment of the invention. Referring to FIG. 2A, printer 50 includes a microprocessor or microcontroller 52 which couples to various print mechanisms including a ribbon web control 54, a print head control 56 and a platen control 58. Microprocessor 52 also couples to a communication link through input/output circuitry 60 into a clock 62. A user input/output is also provided along with an optional display 66. A memory 68 is configured to contain rules, trained values, and sensitivity parameters as discussed herein. An optional web page monitor and control interface 70 is also provided.

Microprocessor 52 includes a supervisory module 80 along with various control algorithms 82, 84 and 86. In this example, these control algorithms control a ribbon, a print head and a platen, respectively. These are example print mechanisms. Ribbon web control 54 includes a digital to analog converter 100 which provides an output to drive circuit 102. Drive circuit 102 controls a motor 104 which drives a ribbon take up wheel 106. Ribbon web position is sensed by an encoder sensor 108 which provides an output to signal conditioning circuitry 110 which in turn is digitized by analog to digital converter 112. Optional compensation is provided to the digitized signal by compensation circuitry 114 which is then provided to ribbon control algorithm 82 as feedback. Print head control 56 and platen control 58 have similar function blocks. However, for example, print head control 56 includes a thermal print head 120 and a temperature sensor such as an RTD 122 to sense print head temperature. The sensed temperature is provided as feedback to print head control algorithm 84. Similarly, platen control 58 includes a motor 130 which drives a platen 132. Ribbon position is sensed by sensor 134 and provided as feedback to platen control algorithm 86.

FIG. 2B is a more simplified view of an identification card printer 150 of the present invention. Identification card 150 includes microprocessor 152 which communicates with input/output circuitry 154, clock 156, memory 158, user input/output 160 and an optional display 162. An optional web interface 164 is also provided for communicating with rules, trained values and sensitivity parameters stored in memory 158. A general control element 170 is activated by an actuation device 172 in response to an analog signal received via digital to analog converter for microprocessor 152. Feedback is provided to the control algorithm 176 in microprocessor 152 by sensor 178. The output from sensor 178 is digitized by analog to digital converter 180 and compensated by compensation circuitry 182. In general, the actuation device 172 and/or control element 170 illustrate a print mechanism in accordance with the present invention. Similarly, in general a process signal is generated by any combination of sensor 178, analog to digital converter 180 and/or compensation circuitry 182 and provided to a process signal input of microprocessor 152.

The sensor 178 is used to provide the measurement of a parameter for feedback to the control algorithm.

Sensors require appropriate circuitry and signal conditioning to excite the sensor and extract the sensed parameter. The analog parameter is converted to a digital value with an A/D converter 180 to provide a digital input to a digital microcontroller or microprocessor 152.

A microprocessor 152 such as the Motorola HC16 or MPC 823 is used to control the printer process. Such a microcontroller typically has an integrated I/O bus for inputs such as digital sensor inputs for the process variable or diagnostic variable, as well as for outputs to actuating devices such as motors, heaters, print heads, clutches, etc. The microcontroller 152 also provides the control function with a control algorithm 176 such as on/off, PID control, fuzzy control, etc., for the closed loop control of the illustrated process loop in printer 150. Typically, a single microcontroller 152 will control several or all of the processes in a plastic ID printer such as card feeding, card encoding, card flipping, printing, laminating, and card transporting.

The control algorithm 176 for controlling store in memory associate with microcontroller 152. The algorithms are optimized for each process type, continuous or discrete and the process. Most commonly the algorithms are on/off coordinated sequencing of on/off devices, bang-bang, PID, fuzzy control, and combinations of the above. Supervisory control is also provided to coordinate multiple processes. An example of supervisory control is the coordination of print head control with the card transport used to index the card while printing.

A final control device 170 is used for controlling the process. Typical control devices in a plastic ID card printer will include both discrete and continuous actuation devices. Examples of discrete control devices are stepper motors and solenoids. Continuous actuation devices include thermal print heads, ink jet heads, lamination roller heaters, heated platen rollers, continuous DC motors, card straightener heaters etc.

User I/O device 160 enables a user to adjust process setpoint or control values. Typical input devices include push buttons, keypads or keyboards, mice, remote networked computers, etc. An output device is optionally provided for displaying parameters, diagnostic variables, control setpoints, etc. The user I/O 160 is typically the primary means for communicating between the printer 150 and the user. The output can also include audio, video or text streaming capability.

Memory 158 includes a rule, an initial parameter value, trained values and a sensitivity parameter. The microprocessor 152 acts in accordance with instructions stored in memory 152. The combination of the sensitivity parameters and the trained values provide a nominal value. The trained values can be obtained by monitoring operation of the process stored in memory 152 during manufacture or subsequent to manufacture.

Figure 3:
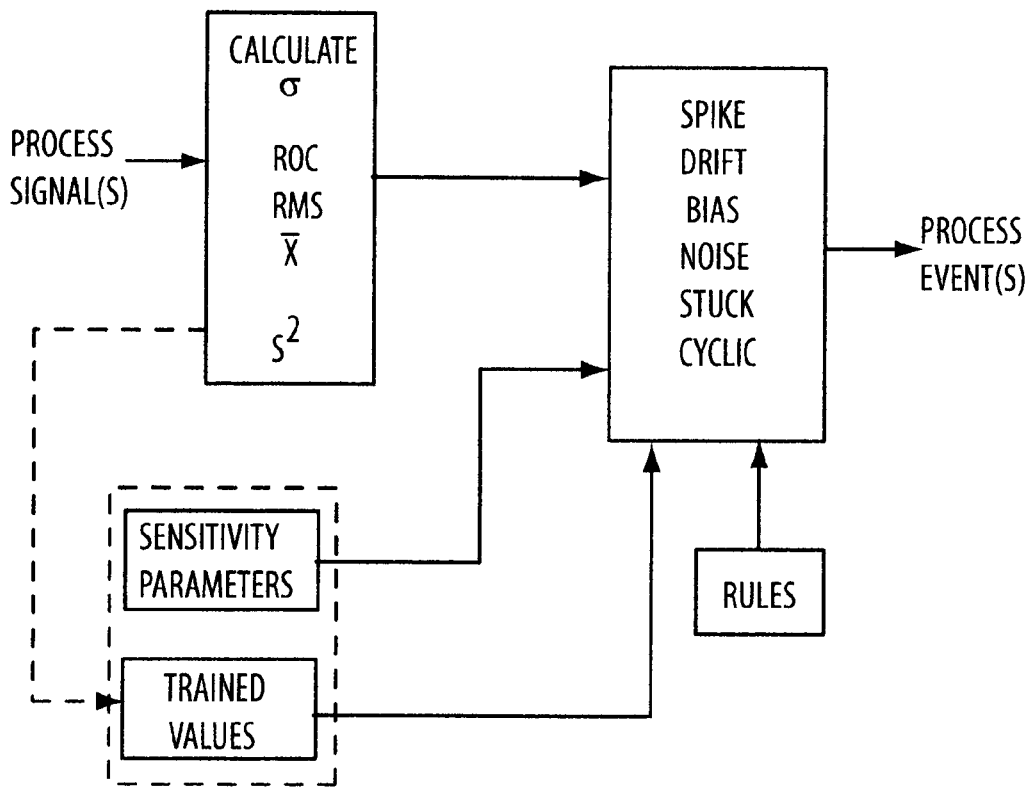
FIG. 3 is a diagram of the method for applying rules to a calculated statistical parameter to provide a printing process event output.

FIG. 3 is a block diagram showing a logical implementation of a printer process diagnostic system. The logic block receives process signals and calculates statistical parameters for the process signals. These statistical parameters include standard deviation, mean, sample variance, root-mean-square (rms), range (delta R), and rate of change (ROC) of the process signal. These are given by the following equations:

$$\text{mean} = \overline{X} = \frac{1}{N} \sum_{i=1}^{N} X_i \qquad \text{EQ. 1}$$

$$\text{RMS} = \sqrt{\frac{i}{N} \sum_{i=1}^{N} X_i} \qquad \text{EQ. 2}$$

$$\sqrt{\sigma} = \sqrt{\text{standard deviation}} = \text{variance} = S^2 = \frac{1}{n-1} \sum_{i=1}^{N} (X_i - \overline{x})^2 \qquad \text{EQ. 3}$$

$$ROC = r_i = \frac{x_i - x_{i-1}}{T} \qquad \text{EQ. 4}$$

$$\Delta R = X_{max} - X_{MIN} \qquad \text{EQ. 5}$$

Where N is the total number of data points in the sample period, $x_i$ and $x_{I-1}$ are two consecutive values of the process signal and T is the time interval between the two values. Further, $x_{max}'$ and $X_{min}$ are the respective maximum and minimum of the process signal over a sampling or training time period. These statistical parameters are calculated alone or in any combination. It will be understood that the invention includes any statistical parameter other than those explicitly set forth which may be implemented to analyze a process signal. The calculated statistical parameter is received by rule calculation block which operates in accordance with rules stored in memory. Rules block also receives trained values from memory.

Trained values are the nominal (i.e., typical) statistical parameter value for the process signal and comprise the same statistical parameters (standard deviation, mean, sample variance, root-mean-square (RMS), range and rate of change, etc.) used in the logical block. In one embodiment, the trained values are provided by the manufacturer and stored in memory of printer during manufacture. In another embodiment, input circuitry may generate or receive the trained values or be used to transmit the trained values to another process device over loop. In yet another embodiment, the trained values are generated by a statistical parameter logical block which generates, or learns, the nominal or normal statistical parameters during normal operation of the process. These statistical parameters are used to generate the trained values in memory for future use. This allows dynamic adjustment of trained values for each specific loop and operating condition. In this embodiment, statistical parameters are monitored for a user selectable period of time based upon the process dynamic response time.

Rules block receives sensitivity parameters from memory. Rules logical block provides examples of a number of different rules. Each sensitivity parameter value provides an acceptable range or relationship as determined by the appropriate rule between the calculated statistical parameters and the appropriate trained values. The sensitivity parameter values may be set by the manufacturer, received over loop or input using input circuitry. The sensitivity parameters are adjusted for the specific application. For example, in process control applications where high accuracy is required, the sensitivity parameters are set so as to allow only small variations of the process signals relative to the trained values. The use of sensitivity parameters allow the diagnostics and event detection decision making to be controlled based upon the particular process and the requirements of the user.

Figure 4:
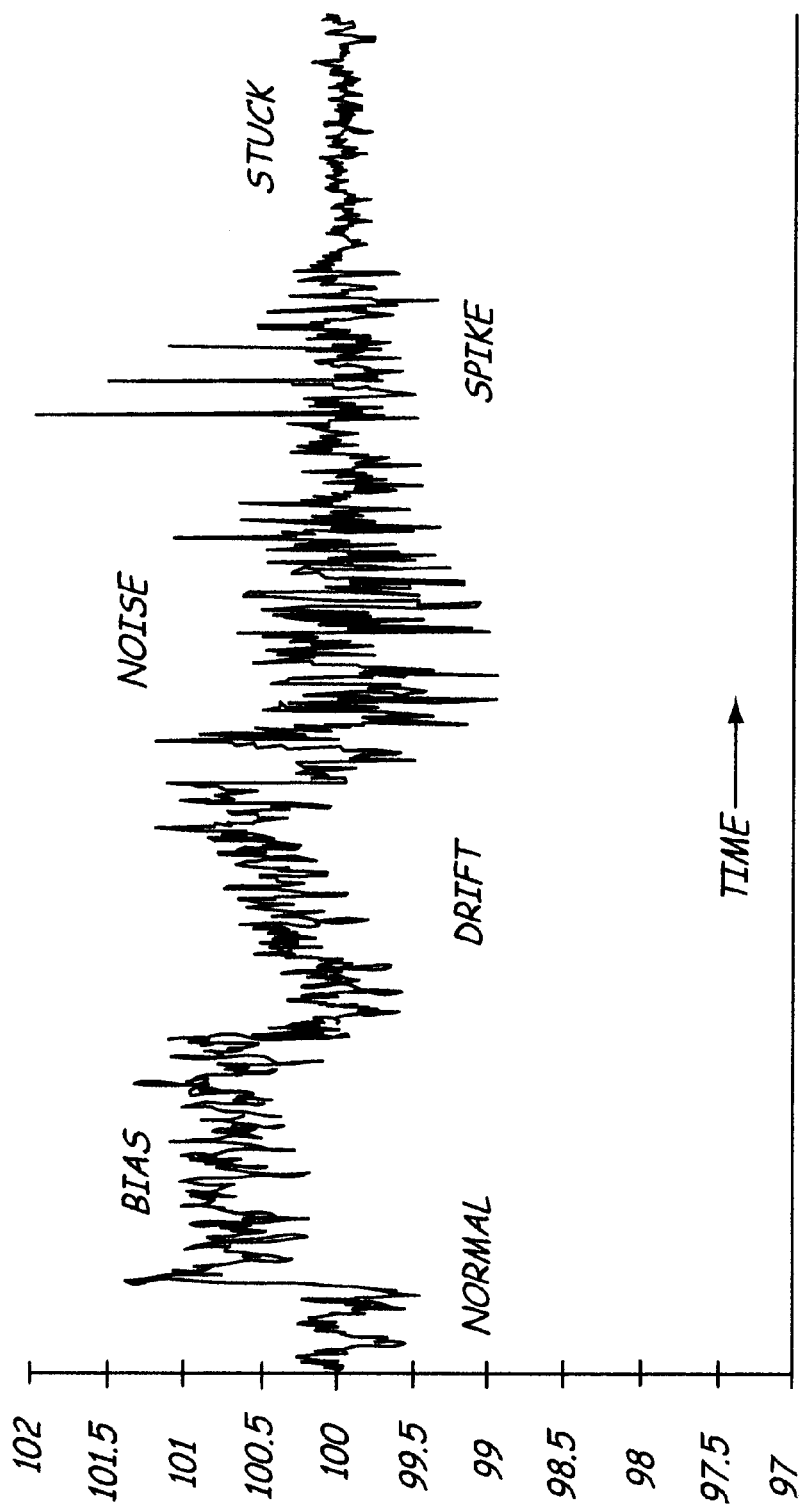
FIG. 4 is a graph of a printing process signal output versus time showing typical types of events.

FIG. 4 is an example of a printing process signal versus time which shows different process events (e.g. normal, bias, drift, noise, spike and stuck) which are detected using the present invention. The process signal shown in FIG. 4 is initially in a normal state and the moves to a bias condition. Next the printing process signal goes through a drift condition followed by a noisy signal condition. Finally, a series of spike events occur in the process signal followed by a stuck condition. Examples of rules used to detect these events are described below.

Drift occurs when a printing process signal changes over time from its true (i.e. nominal) value. One embodiment of the invention includes a rule which operates on a statistical parameter mean ($\mu$), the trained parameter mean ($\mu'$) and a tuning parameter alpha ($\alpha$) to detect drift.

Drift sensitivity is controlled by a single sensitive parameter, alpha ($\alpha$). Alpha ($\alpha$) represents a percentage above or below the normal mean signal level that is tolerable before a drift or event is detected. The following rule performed by microprocessor 86 or 152, for example, detects a drift event:

if $\mu<\mu'$ (1−$\alpha$) then a negative drift event
if $\mu>\mu'$ (1+$\alpha$) then a positive drift event where $\mu$ is the current mean of the process signal from, $\mu'$ is the trained mean from and $\alpha$ is the sensitivity parameter from which defines the acceptable variations from the mean. Additionally, the mean is monitored over time. A drift event is only detected if, over a series of consecutive sample period, the mean is moving away from the trained value. The trained mean ($\mu'$) may be learned by training the printer during normal operation of the printing process.

Bias is the result of a temporary drift "stabilizing" at a certain level above or below the expected signal level. When the drift stops, the resulting signal has a bias, sometimes called an offset from the true/nominal value. A bias is detected using the same ruled used for drift. Additionally, the mean is monitored over time. If the mean is not continuing to move away from the trained mean ($\mu'$), then the printer determines that the event is bias, not drift.

A different combination of a rule, tuning parameters and trained values can be used to detect noise in a process signal of a printer. Noise detection sensitivity is adjusted by adjusting a sensitivity parameter beta ($\beta$). Beta ($\beta$) is the amount of the current (present) standard deviation ($\sigma$) can be above or below the trained standard deviation ($\sigma$) before detection of a noise event. For example, if the printer is configured to detect a noise event when the process signal is twice as noisy as a the trained value, $\beta$ should be sent to 2.0. Range ($\Delta R$) is also used by the rule to differentiate noise from normal signal variations. An example rule for noise detection is:

If $\sigma>\beta\sigma'$ and
if $\Delta R>\Delta R'$ then noise detected;

where $\sigma$ and $\sigma'$ are the current and trained standard deviation, $\Delta R$ and $\Delta R'$ are the current and trained range, respectively, and $\beta$ is the noise sensitivity parameter.

Yet another example combination of a rule, statistical value, turning parameters and trained values detect a stuck condition in a process signal. A "stuck" process signal is one which a condition of the process signal does not vary with time. Stuck sensitivity is controlled by adjusting the sensitivity parameter gamma ($\gamma$). A value for gamma ($\gamma$) is expressed as a percentage of the trained standard deviation ($\sigma'$) and represents how small a change in standard deviation from the trained value will trigger detection of a stuck event. For example, if the printer is configured to detect a stuck condition when the printing process signal noise level is half of the trained value, $\gamma$ should be set equal to percent (0.5). Further, range of the signal ($\Delta R$) can be used to reduce errors in small signals. One example rule is:

If $(\sigma+\Delta R)\leq\gamma(\sigma'+\Delta R')$ then a stuck event is detected.

A different combination of a rule, a statistical value, trained value and sensitivity parameter is used to detect a spike event. A spike event occurs when the signal momentarily goes to an extreme value. Sensitivity to spikes in the process signal is controlled by adjusting a sensitivity parameter sigma $\delta$ stored in memory. $\delta$ is the acceptable trained maximum rate of change ($\Delta r_{max}$) between two consecutive data points. For example, if the printer is configured to detect any spikes that have a rate of change (ROC) that is 30% greater than $\Delta r_{max}$ from the trained value, $\delta$ should be set to 1.30. An example rule is:

if ROC>$\delta\cdot\Delta r_{max}$ then a spike event is detected

Other example rules include a cyclic rule to detect cyclical oscillations in the process signal and an erratic rule to detect erratic behavior in the process signal. It should be understood other rules may be implemented to observe other events in the printing process signal and may use different formulas or computational techniques to detect an event. A rule may operate on more than one statistical parameter or on more than one process signal. For example, if a process variable such as ribbon speed falls below a predetermined limit while another process spikes, that process variable such as print head temperature is overheating and an emergency shutdown condition could exist. Furthermore, another type of rule is implemented in fuzzy logic in which the statistical parameter is operated on by a sensitivity parameter which is a membership function applied to the trained values.

All of the rules discussed herein provide a process event output based upon the operation of the rule. It should be understood that the printing process event output may have a plurality of discrete or continuous values based upon operation of the rule. Note that the combination of the sensitivity parameter and the trained value provides a nominal parameter value and that the rule operates on the nominal parameter value and the statistical parameter. The various printing process signals, parameters and trained values can be combined using weighted averages or appropriate fuzzy logic. Membership functions include, for example, trapezoidal and triangular functions. For example, the statistical parameter can be mapped onto a membership function. These are then used during training to generate the trained values, and to generate the statistical parameters for use by the rules. Rules can also be implemented in neural networks.

In one embodiment, the trained values are obtained by determining that the printing process is stable, and generating the statistical parameters for a selectable period of time. These are stored as the trained values. The selectable period of time should be about the same as sampling period or block used to generate the statistical parameters during operating. This process may be user initiated or automated.

The output of a rule can be transmitted over I/O 22 shown in FIG. 1, output on user I/O 160 or display 162 in FIG. 2B, of output on a web page 164, stored for future use, used as an input to another printer computation such as another rule or a control function, or used in any other manner. In another embodiment, the present invention monitors printer process signals and performs comparisons between these signals. For example, a plurality of process signals should all be within a desired tolerance between one another as set forth by the appropriate combination of sensitivity rules and trained values. In one embodiment, data is published to a webpage. Example data includes measured or calculated variables, statistical parameters, or diagnostic information can be embedded in a webpage which is published by the printer.

Figure 5:
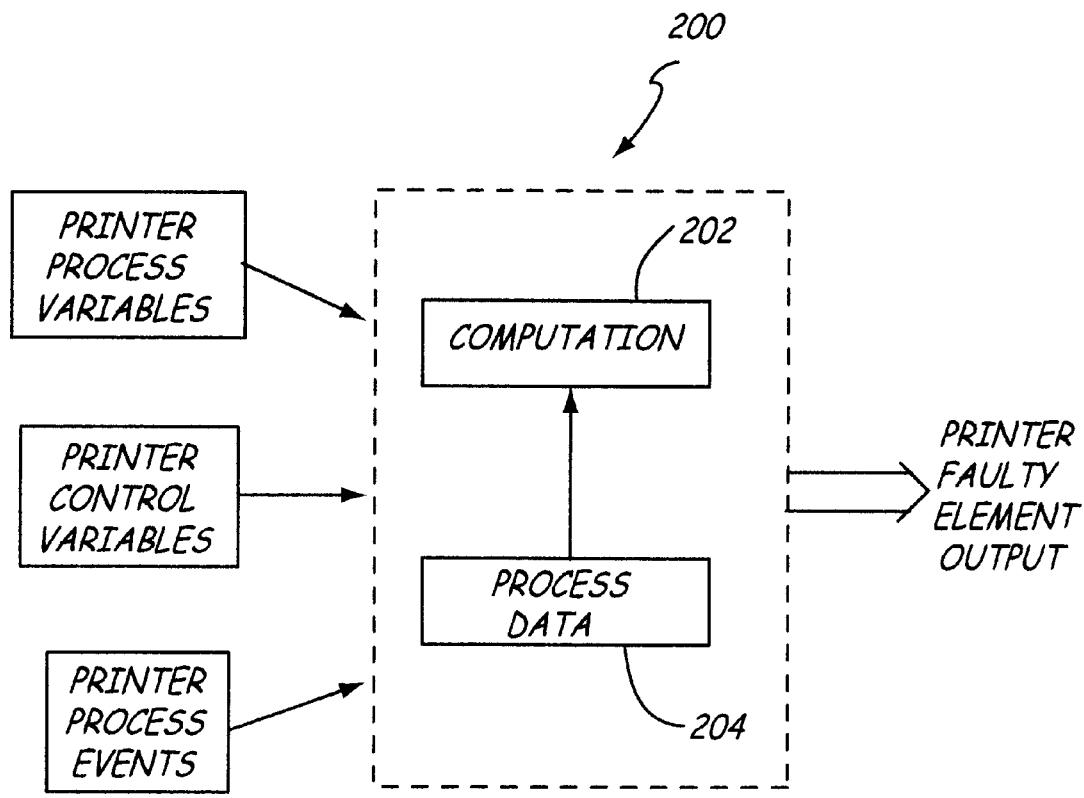
FIG. 5 is a block diagram showing a printer inference engine operating on process events in accordance with the invention.

FIG. 5 is a block diagram showing an inference engine 200. Inference engine 200 can reside in a printer or at a remote location, and receives printer process variables, printer control signals and printer process events. Process events are detected in accordance with the present invention. Inference engine 200 includes computation circuitry 202 and printer process data 204. Printer process data may comprise, for example, printer process history information such as logged printer process variables, control signals, process events or other process signals and may contain process specific information which further defines the process being monitored. Upon the occurrence of a process event, the inference engine 200 determines which component in the various printer components is faulty. Computation circuitry 202 analyzes process variables, control signals, process events and other process signals to determine the cause of the process event. Computation circuitry 202 operates in accordance with a series of rules such as those used in the known technique of an expert system. Computation circuitry 202 operates on all of the inputs including process data and provides a faulty element output such as a warning signal. For example, if a drift event is detected, inference engine operates to determine the cause of the drift. For example, the drift may be due to a control setpoint such as print head temperature which was changed, in which case computation circuitry 202 determines that the controller is operating properly. However, if the setpoint was not changed, the inference engine 200 further analyzes the various inputs and, for example, checks the integrity of the component reporting a process event, such as the print head, laminator, card feed, roller, etc., by running appropriate diagnostics. If the diagnostic indicates that the component is operating property, the inference engine 200 may then perform more general printer diagnostics to determine if a printer and associated sensors are operating property. These diagnostics may observe information from the specific element being reviewed and may also observe information being received from other sources such as other components used to control printing. Computation circuitry 202 uses any appropriate computational technique such as a series of rules, fuzzy logic or neural networks. In a preferred embodiment, inference engine 200 is implemented in a microprocessor and memory and may be located in the printer, or, at some remote location. The faulty element output can be provided to an operator or can be used by additional computational circuitry which performs further diagnostics.

Figure 6:
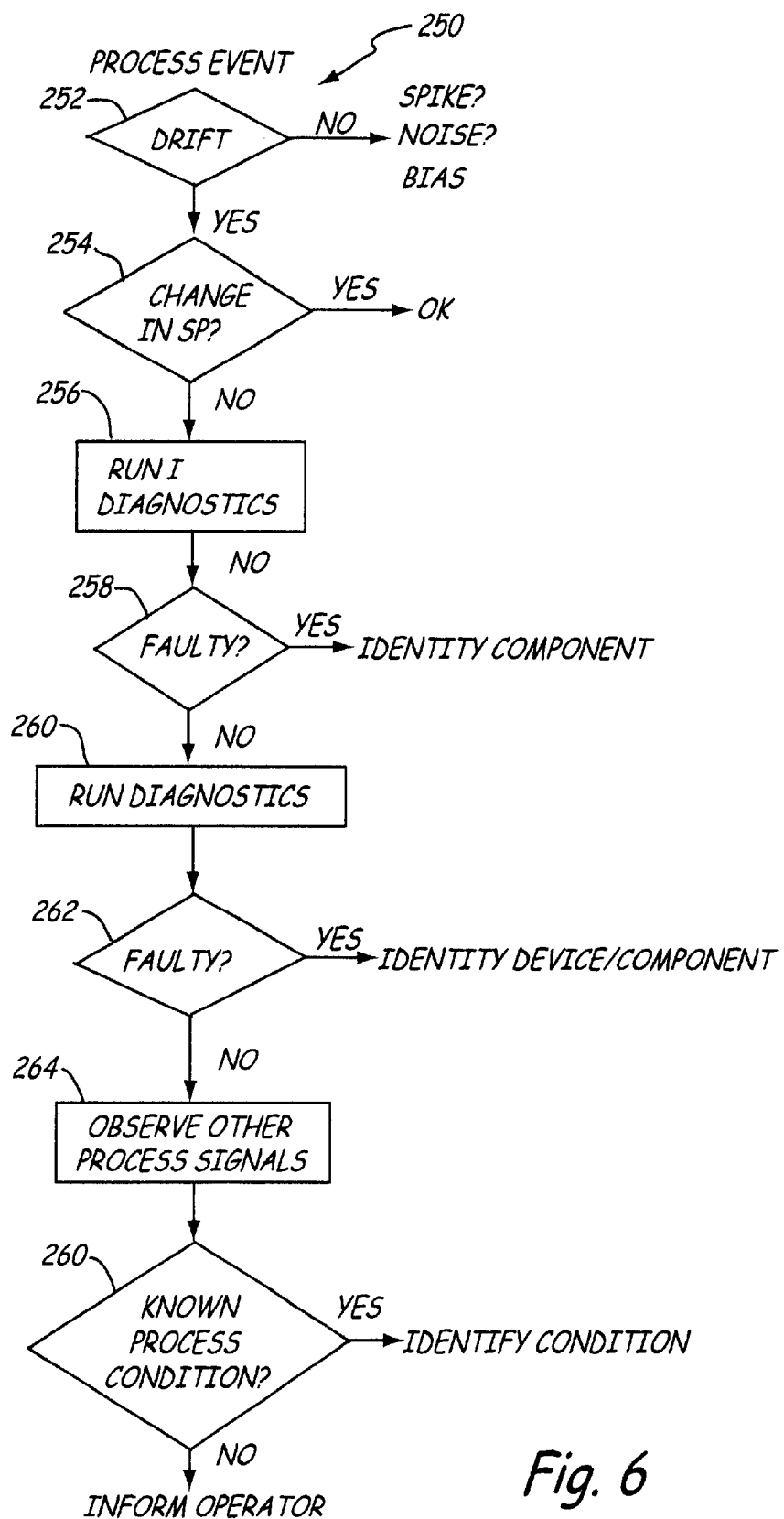
FIG. 6 is a simplified block diagram of a printer interference engine in the present invention.

FIG. 6 shows a block diagram 250 of a simplified, example inference engine such as engine 200 operating in accordance with a rule base. Upon the occurrence of a process event, at block 252 the inference engine examines the process event to identify the specific event which was detected. If the event was a drift event, control moves to block 254. If the event was some other event such as spike, noise or bias, control moves to a rule base constructed in accordance with the specific event which was detected. At block 254, the inference engine checks to see if the setpoint of the process was recently changed. If the setpoint was recently changed, an output is provided which indicates that the process is operating within its normal range and that the drift which was detected was due to the change in setpoint. However, if the setpoint was not changed, the inference engine moves on to block 256 to run further diagnostics. At block 256, the inference engine instructs the printer to run diagnostics to further determine the cause of the drift. At block 258, if the diagnostics run by the printer identify the cause of the drift, the inference engine provides an output identifying a fault component. However, if the diagnostics indicate that components are operating properly, inference engine performs diagnostics on related components at block 260. For example, related components may be at other locations along the path of travel of the card. At block 262, the inference engine determines if one of the related component is the faulty component. If the fault which caused the drift is one of the related components, the inference engine provides an output identifying the faulty component. If none of the related components are in error, the inference engine observes other process signals at block 264, in an attempt to identify known process conditions at block 260. If the cause of the drift is due to a known process condition, for example, extended printing of a single color, the specific condition is identified. If the process condition is not known, an output is provided for example to an operator which indicates that a drift event has been detected whose cause cannot be identified. At any point in the flow chart, based upon any of the various rules, the inference engine may initiate a printer shutdown procedure to shut down the printing process. As discussed above, actual inference engines will contain a much more sophisticated rule base and/or will employ more sophisticated forms of logic such as fuzzy logic and neural networks, specific to each process control application.

Although the present invention has been described with reference to preferred embodiments, workers skilled in the art will recognize that changes may be made in form and detail without departing from the spirit and scope of the invention.

What is claimed is:

1. An identification card printer for printing an identification card, comprising:
   a print mechanism configured to print onto the identification card;
   a process signal input configured to receive a process signal generated during processing of an identification card by the identification card printer;
   a memory containing a nominal process signal statistical parameter and a rule; and
   a microprocessor coupled to the memory and configured to receive the process signal from the process signal input, the microprocessor further configured to calculate a statistical parameter of the process signal, compare the calculated statistical parameter to the nominal statistical parameter based upon the rule and responsively provide an event output as a function of the comparison, the event output related to an occurrence of an event during operation of the identification card printer.

2. The identification card printer of claim 1 including a control loop configured to control operation of the identification card printer as a function of the process signal.

3. The identification card printer of claim 1 including a sensor configured to sense operation of the identification card printer and responsively generate the process signal.

4. The identification card printer of claim 3 wherein the sensor comprises a position sensor.

5. The identification card printer of claim 3 wherein the sensor comprises a pressure sensor.

6. The identification card printer of claim 3 wherein the sensor comprises a heat sensor.

7. The identification card printer of claim 3 wherein the sensor comprises an optical sensor.

8. The identification card printer of claim 3 wherein the sensor comprises a tension sensor.

9. The identification card printer of claim 3 wherein the sensor comprises a quantity sensor.

10. The identification card printer of claim 3 wherein the sensor comprises a power sensor.

11. The identification card printer of claim 3 wherein the sensor comprises a current sensor.

12. The identification card printer of claim 3 wherein the sensor comprises a voltage sensor.

13. The identification card printer of claim 3 wherein the sensor comprises a sensor configured to sense a lamination process of the printer.

14. The identification card printer of claim 1 wherein the process signal is related to a temperature.

15. The identification card printer of claim 1 wherein the process signal is related to a position.

16. The identification card printer of claim 1 wherein the process signal is related to a motor current.

17. The identification card printer of claim 1 wherein the process signal is related to a motor voltage.

18. The identification card printer of claim 1 wherein the process signal is related to a rotary position.

19. The identification card printer of claim 1 wherein the process signal is related to a web tension.

20. The identification card printer of claim 1 wherein the process signal is related to a magnetic field strength.

21. The identification card printer of claim 1 wherein the process signal is related to a vibration.

22. The identification card printer of claim 1 wherein the process signal comprises a control signal.

23. The identification card printer of claim 22 wherein the control signal comprises desired temperature.

24. The identification card printer of claim 22 wherein the control signal comprises desired pressure.

25. The identification card printer of claim 22 wherein the control signal comprises desired force.

26. The identification card printer of claim 22 wherein the control signal comprises desired position.

27. The identification card printer of claim 22 wherein the control signal comprises desired current.

28. The identification card printer of claim 22 wherein the control signal comprises desired voltage.

29. The identification card printer of claim 22 wherein the control signal comprises desired tension.

30. The identification card printer of claim 22 wherein the control signal comprises a calibration value.

31. The identification card printer of claim 22 wherein the control signal comprises an alarm.

32. The identification card printer of claim 22 wherein the control signal comprises an alarm condition.

33. The identification card printer of claim 22 wherein the control signal comprises an on/off signal.

34. The identification card printer of claim 1 wherein the process signal comprises a diagnostic signal.

35. The identification card printer of claim 1 wherein the process signal comprises a resistance.

36. The identification card printer of claim 1 wherein the process signal comprises a frequency.

37. The identification card printer of claim 1 wherein the process signal comprises a back EMF.

38. The identification card printer of claim 1 including a controller to control printing.

39. The identification card printer of claim 1 wherein the process signal is a function of signals from more than one sensor.

40. The identification card printer of claim 1 wherein the process signal relates to a printing process.

41. The identification card printer of claim 1 wherein the process signal relates to an encoding process.

42. The identification card printer of claim 1 wherein the process signal relates to a card feeding process.

43. The identification card printer of claim 1 wherein the process signal relates to a card flipping process.

44. The identification card printer of claim 1 wherein the event output comprises a network output.

45. The identification card printer of claim 1 wherein the event output comprises an event output configured to publish as a web page.

46. The identification card printer of claim 1 wherein the event output comprises a display output.

47. The identification card printer of claim 1 wherein the memory includes a sensitivity parameter and the event output is further a function of the sensitivity parameter.

48. The identification-card printer of claim 47 wherein the event output is a function of the sensitivity parameter.

49. The identification card printer of claim 1 wherein the nominal process signal is a function of trained values.

50. The identification card printer of claim 1 wherein a statistical parameter comprises a standard deviation.

51. The identification card printer of claim 1 wherein a statistical parameter comprises a mean.

52. The identification card printer of claim 1 wherein a statistical parameter comprises a sample variance.

53. The identification card printer of claim 1 wherein a statistical parameter comprises a root-mean-square (RMS).

54. The identification card printer of claim 1 wherein a statistical parameter comprises a range (delta R).

55. The identification card printer of claim 1 wherein a statistical parameter comprises a rate of change (ROC).

56. The identification card printer of claim 1 wherein the nominal process signal statistical parameter is a function of previous values of the process signal.

57. The identification card printer of claim 56 wherein the previous values of the process signal are obtained during stable operation of the process.

58. The identification card printer of claim 1 wherein the event output is indicative of bias.

59. The identification card printer of claim 1 wherein the event output is indicative of drift.

60. The identification card printer of claim 1 wherein the event output is indicative of noise.

61. The identification card printer of claim 1 wherein the event output is indicative of a spike.

62. The identification card printer of claim 1 wherein the event output is indicative of a stuck signal.

63. The identification card printer of claim 1 wherein the event output is indicative of a normal signal.

64. The identification card printer of claim 1 wherein the rule is an if-then rule rule.

65. The identification card printer of claim 1 wherein the rule comprises a fuzzy logic operation.

66. The identification card printer of claim 1 wherein the rule comprises a neural network operation.

67. The identification card printer of claim 1 wherein the rule operates on more than one process signal.

68. The identification card printer of claim 1 including an inference engine configured to identify a cause of the event output.

* * * * *

UNITED STATES PATENT AND TRADEMARK OFFICE
CERTIFICATE OF CORRECTION

PATENT NO.    : 6,735,484 B1  
DATED         : May 11, 2004  
INVENTOR(S)   : Gary A Lenz Page 1 of 1

It is certified that error appears in the above-identified patent and that said Letters Patent is hereby corrected as shown below:

Title page,
Item [56], References Cited, OTHER PUBLICATIONS,
"Tuned-Circuit Dual-Mode Johnson Noise Thermometers" reference, delete "Shepart" and "Measurement of the Temperture Fluctuation in a Resistor Generating 1/F Fluctuation" reference, insert -- Shepard --.; delete "Temperture" and insert -- Temperature --.

Column 3,
Line 15, delete "includes" and insert -- include --.

Column 12,
Line 23, delete "-"

Signed and Sealed this

Twenty-eighth Day of September, 2004

JON W. DUDAS  
*Director of the United States Patent and Trademark Office*